US010970946B2

(12) United States Patent
Sakurada

(10) Patent No.: US 10,970,946 B2
(45) Date of Patent: Apr. 6, 2021

(54) INFORMATION ACQUISITION APPARATUS, INFORMATION ACQUISITION METHOD, AND PROGRAM

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/582,179

(22) Filed: Sep. 25, 2019

(65) Prior Publication Data

US 2020/0168011 A1 May 28, 2020

(30) Foreign Application Priority Data

Nov. 26, 2018 (JP) .............................. JP2018-220656

(51) Int. Cl.
G07C 5/08 (2006.01)
G07C 5/00 (2006.01)
H04L 29/08 (2006.01)

(52) U.S. Cl.
CPC ........... *G07C 5/0816* (2013.01); *G07C 5/008* (2013.01); *H04L 67/12* (2013.01)

(58) Field of Classification Search
CPC .... G07C 5/0808; G07C 5/0816; G07C 5/008; G07C 5/02
See application file for complete search history.

(56) References Cited

U.S. PATENT DOCUMENTS

| 4,517,832 | A * | 5/1985 | Holland | B60G 17/01933 340/438 |
|---|---|---|---|---|
| 10,300,760 | B1 * | 5/2019 | Aikin | B60G 17/0416 |
| 2006/0089771 | A1 * | 4/2006 | Messih | B60R 21/0132 701/45 |
| 2010/0152969 | A1 * | 6/2010 | Li | G08G 1/096725 701/37 |
| 2010/0312492 | A1 * | 12/2010 | Fryk | B60G 17/0165 702/33 |
| 2013/0057399 | A1 * | 3/2013 | Panse | B60G 17/017 340/440 |
| 2014/0139352 | A1 * | 5/2014 | May | H04B 1/713 340/870.07 |
| 2016/0023530 | A1 * | 1/2016 | Guest | B60G 17/0165 701/38 |

FOREIGN PATENT DOCUMENTS

JP  2009-208094 A  9/2009
JP  2011-251584 A  12/2011

* cited by examiner

Primary Examiner — Emily C Terrell
(74) Attorney, Agent, or Firm — Oblon, McClelland, Maier & Neustadt, L.L.P.

(57) ABSTRACT

An information acquisition apparatus according to one embodiment of the present disclosure includes an actual use state-related information acquisition unit that acquires the sprung mass of a vehicle in one trip based on displacement information of a sprung part of the vehicle acquired by a vehicle height sensor in the vehicle, and an actual use state analysis unit that acquires information regarding an actual use state of the vehicle regarding a loading state of a loaded object on the vehicle in a relatively long period based on the sprung mass in one trip.

19 Claims, 5 Drawing Sheets

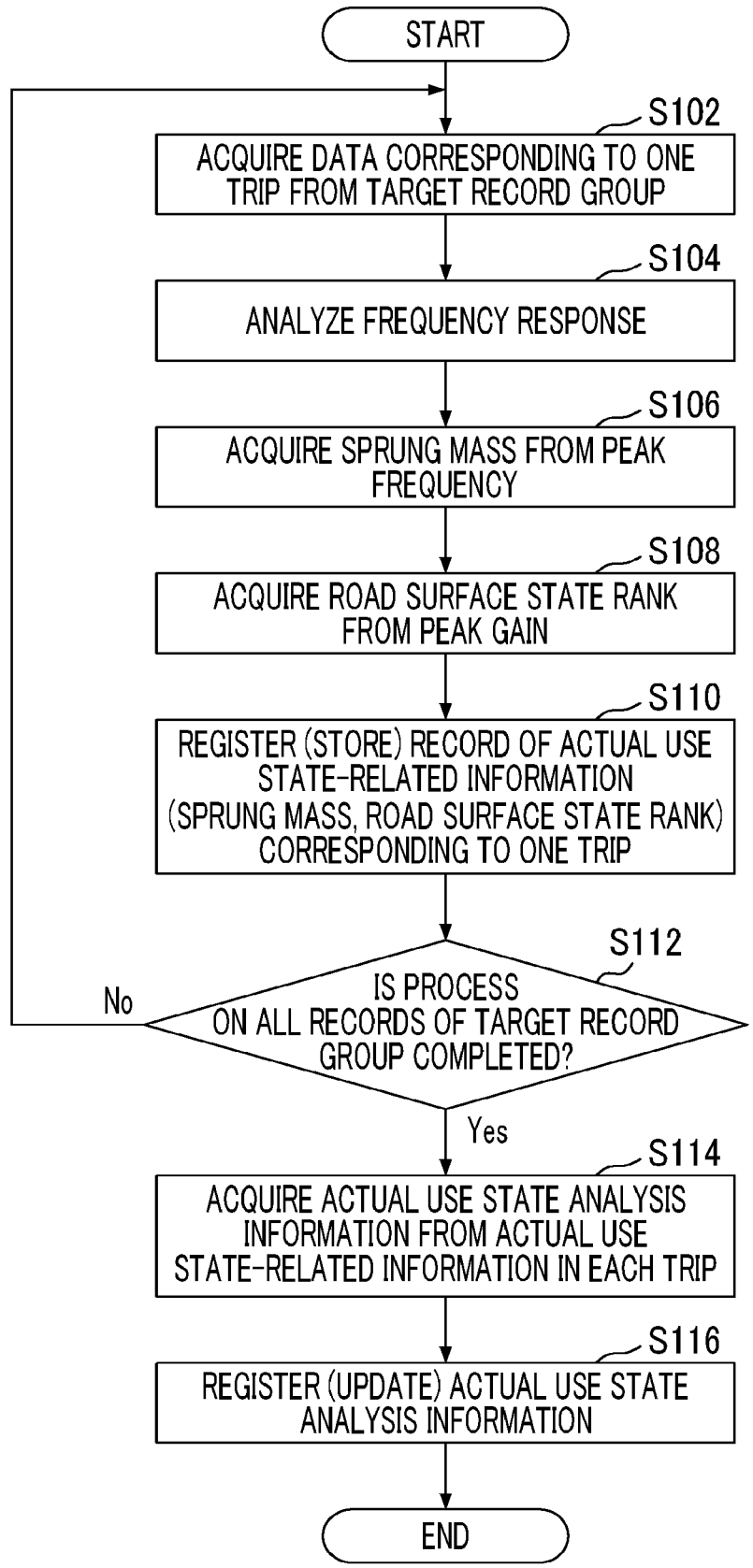

INFORMATION ACQUISITION APPARATUS, INFORMATION ACQUISITION METHOD, AND PROGRAM

INCORPORATION BY REFERENCE

The disclosure of Japanese Patent Application No. 2018-220656 filed on Nov. 26, 2018 including the specification, drawings and abstract is incorporated herein by reference in its entirety.

BACKGROUND

1. Technical Field

The present disclosure relates to an information acquisition apparatus and the like.

2. Description of Related Art

For example, there is a technique of notifying a driver of assistance information (advice) regarding fuel efficiency or maintenance of a vehicle. (for example, refer to Japanese Unexamined Patent Application Publication No. 2011-251584 (JP 2011-251584 A) and Japanese Unexamined Patent Application Publication No. 2009-208094 (JP 2009-208094 A)).

SUMMARY

However, an actual use state of a vehicle may differ in each vehicle. Thus, an advice on fuel efficiency or maintenance of a vehicle is preferably performed in a form corresponding to an actual use state of each vehicle. For example, even though such a user who barely loads luggage in a luggage room of a vehicle is advised to reduce luggage in the luggage room in order to improve fuel efficiency, the user may feel annoyed. For example, since a load (fatigue degree) on a component regarding a vehicle body or an undercarriage changes depending on a state in which luggage is loaded on a vehicle or a road surface state of a road on which a vehicle is traveling, even though an advice on maintenance is given at a predefined timing, the timing may be deviated from an appropriate timing. Thus, a technique enabling an actual use state of a vehicle to be understood is desirable.

The present disclosure has been made in light of the circumstances, and provides an information acquisition apparatus capable of acquiring information for understanding an actual use state of a vehicle.

A first aspect of the present disclosure relates to an information acquisition apparatus including a first acquisition unit and a second acquisition unit. The first acquisition unit acquires first information regarding an actual use state of a vehicle in a relatively short period based on displacement information of a sprung part of the vehicle in a height direction, acquired by the vehicle. The second acquisition unit acquires second information regarding an actual use state of the vehicle in a relatively long period based on the first information acquired by the first acquisition unit.

According to the first aspect, the information acquisition apparatus can acquire the first information regarding an actual use state of the vehicle regarding a luggage loading state or a road surface state of a road on which the vehicle is traveling in a relatively short period (for example, in one trip) during the use (traveling) of the vehicle by using the displacement information of the sprung part in the height direction, acquired when the vehicle is actually used. This is because an actual use state of the vehicle, such as a loading state of an occupant or luggage of the vehicle or a road surface state of a road on which the vehicle is traveling is reflected in a displacement state of the sprung part in the height direction. The information acquisition apparatus can acquire the second information regarding an actual use state of the vehicle in a relatively long period by, for example, accumulating the first information regarding an actual use state of the vehicle in a relatively short period. Therefore, the information acquisition apparatus can acquire information for understanding an actual use state of the vehicle, specifically, the second information for understanding an actual use state of the vehicle in a relatively long period.

In the information acquisition apparatus according to the first aspect, the first acquisition unit may acquire mass of the sprung part during use of the vehicle in a relatively short period as the first information based on the displacement information, and the second acquisition unit may acquire the second information representing an actual use state of the vehicle regarding a loading state of a loaded object on the vehicle in a relatively long period based on the mass of the sprung part acquired by the first acquisition unit.

According to the first aspect, for example, the information acquisition apparatus can acquire the second information for understanding an actual use state regarding a loading state of a loaded object such as an occupant or luggage of the vehicle in a relatively long period by acquiring the mass of the sprung part during the use of the vehicle in a relatively short period based on the displacement information of the sprung part in the height direction.

In the information acquisition apparatus according to the first aspect, the first acquisition unit may acquire the mass of the sprung part based on a peak frequency in a frequency response of the displacement information.

According to the first aspect, for example, the information acquisition apparatus can acquire the mass of the sprung part during the use of the vehicle in a relatively short period as the first information by using frequency response analysis on the displacement information of the sprung part in the height direction.

In the information acquisition apparatus according to the first aspect, the first acquisition unit may acquire the first information regarding a road surface state of a road during the use of the vehicle in a relatively short period based on the displacement information, and the second acquisition unit may acquire the second information representing an actual use state of the vehicle regarding a road surface state of a road during the use of the vehicle in a relatively long period based on the first information acquired by the first acquisition unit.

According to the first aspect, for example, the information acquisition apparatus can acquire the second information regarding an actual use state of the vehicle regarding a road surface state of a road during the use of the vehicle in a relatively long period by acquiring the information regarding a road surface state of a road during the use of the vehicle in a relatively short period based on the displacement information of the sprung part in the height direction.

In the information acquisition apparatus according to the first aspect, the first acquisition unit may acquire the first information regarding a road surface state of a road during the use of the vehicle in a relatively short period based on a gain frequency in the frequency response of the displacement information.

According to the first aspect, for example, the information acquisition apparatus can acquire the first information regarding a road surface state of a road during the use of the vehicle in a relatively short period by using frequency analysis on displacement information of the sprung part in the height direction.

In the information acquisition apparatus according to the first aspect, the first acquisition unit may acquire the first information in each period from starting to stoppage after traveling of the vehicle, and the second acquisition unit may acquire the second information based on the first information in each period acquired by the first acquisition unit and a traveling distance in each period.

According to the first aspect, for example, the information acquisition apparatus can acquire the second information regarding an actual use state of the vehicle based on the first information regarding an actual use state of the vehicle in a period from starting to stoppage after traveling of the vehicle, that is, in one trip, and a traveling distance in one trip.

A second aspect of the present disclosure relates to an information providing apparatus including an information providing unit. The information providing unit provides at least one of information regarding fuel efficiency improvement of the vehicle and information regarding maintenance of the vehicle to a user of the vehicle based on the second information acquired by the information acquisition apparatus.

According to the second aspect, for example, the information providing apparatus can give an advice on fuel efficiency improvement or maintenance to a user of the vehicle in a form of being appropriate for an actual use state by using the second information regarding an actual use state of the vehicle in a relatively long period, acquired by the information acquisition apparatus.

Other aspects of the present disclosure may be realized as an information acquisition method and a program.

According to the aspects, it is possible to provide an information acquisition apparatus capable of acquiring information for understanding an actual use state of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart schematically illustrating an example of a process in the center server.

DETAILED DESCRIPTION OF EMBODIMENTS

Hereinafter, an embodiment of the disclosure will be described with reference to the drawings.

Summary of Information Acquisition System

Figure 1:
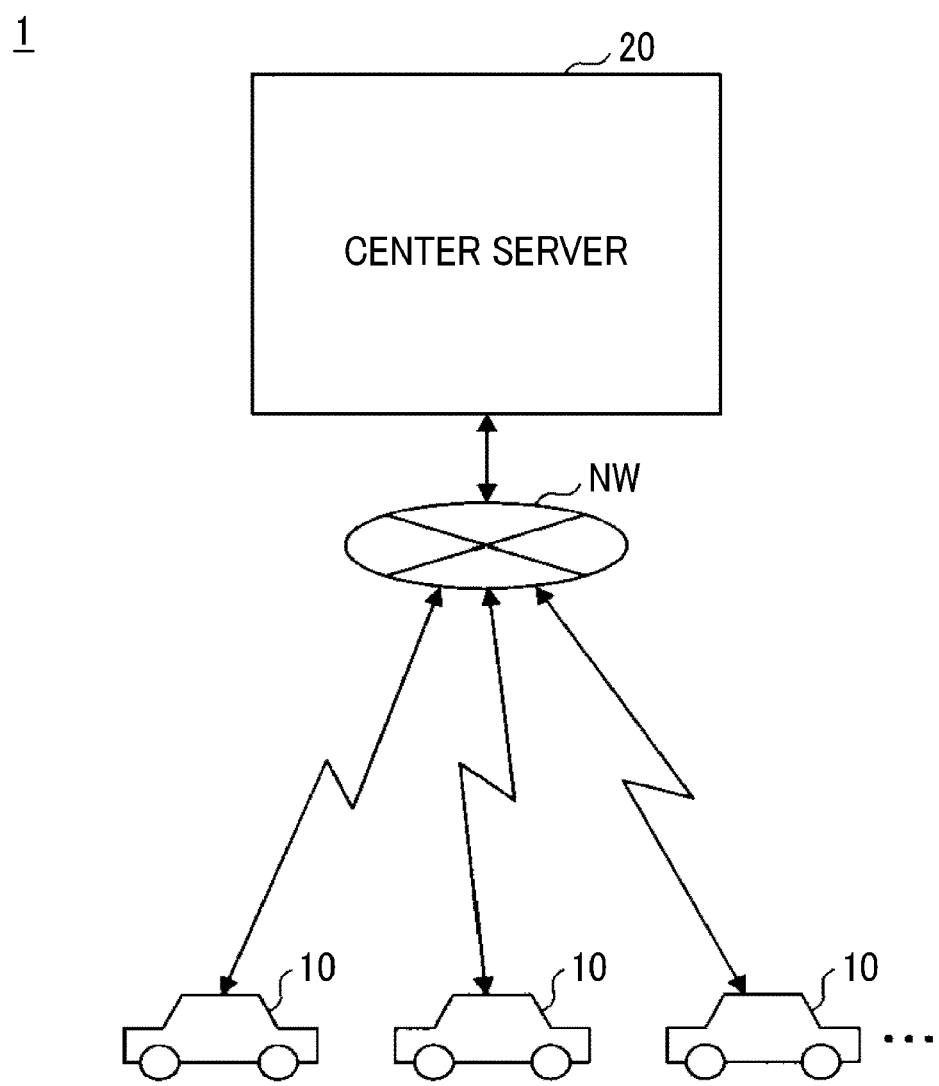
FIG. 1 is a schematic diagram illustrating an example of a configuration of an information acquisition system.

First, with reference to FIG. 1, a description will be made of a summary of an information acquisition system 1 according to the present embodiment.

The information acquisition system 1 includes a plurality of vehicles 10 and a center server 20.

In the information acquisition system 1, the center server 20 collects (accumulates) displacement information (hereinafter, referred to as "vehicle height displacement information") of an sprung part of the vehicle 10 in a height direction, acquired by the vehicle 10 for each of the vehicles 10, via a communication network NW which will be described later, and acquires information (hereinafter, referred to as "actual use state-related information") (an example of first information) regarding an actual use state of the vehicle 10 during each relatively short period (a period corresponding to one trip from starting to stoppage after traveling of the vehicle 10 or a period in which the vehicle 10 travels over a predetermined distance (for example, 10 kilometers)) (hereinafter, referred to as a "first period") based on the vehicle height displacement information. In the information acquisition system 1, the center server 20 acquires information (hereinafter, referred to as "actual use state analysis information") (an example of second information) regarding an actual use state of the vehicle 10 during a relatively long period (for example, a period such as the past several weeks or several months or a period from delivery of the vehicle 10 to a user) (hereinafter, referred to as a "second period") for each of the vehicles 10 based on actual use state-related information of the vehicle 10.

The vehicle 10 is communicably connected to the center server 20 via the communication network NW including, for example, a mobile communication network with a base station as an end, a satellite communication network using a communication satellite in the sky, and the Internet. The vehicle 10 uploads (transmits) dynamic information (hereinafter, referred to as "dynamic vehicle information") related to the predefined type of vehicle 10 to the center server 20 in response to a command from the center server 20 or automatically in accordance with a predefined timing. The dynamic vehicle information may include information (hereinafter, referred to as "vehicle state-related information") regarding various states of the vehicle 10, such as a position state of the vehicle 10, a movement state thereof, a state of a driver operating the vehicle 10, and a control state thereof. The dynamic vehicle information may include information (environmental state-related information) regarding a surrounding environmental state of the vehicle 10, such as a surrounding outside air temperature of the vehicle 10.

The center server 20 (an example of an information acquisition apparatus or an information providing apparatus) is communicably connected to each of the vehicles 10 via the network NW. The center server 20 receives dynamic vehicle information transmitted from each of the vehicles 10, and acquires actual use state-related information and actual use state analysis information based on the dynamic vehicle information as described above. The center server 20 provides various pieces of assistance information (advice) to a user of the vehicle 10 by using the actual use state analysis information.

Details thereof will be described later.

Configuration of Information Acquisition System

Next, a description will be made of a configuration of the information acquisition system with respect to FIGS. 2A to 5 in addition to FIG. 1.

Figure 2A:
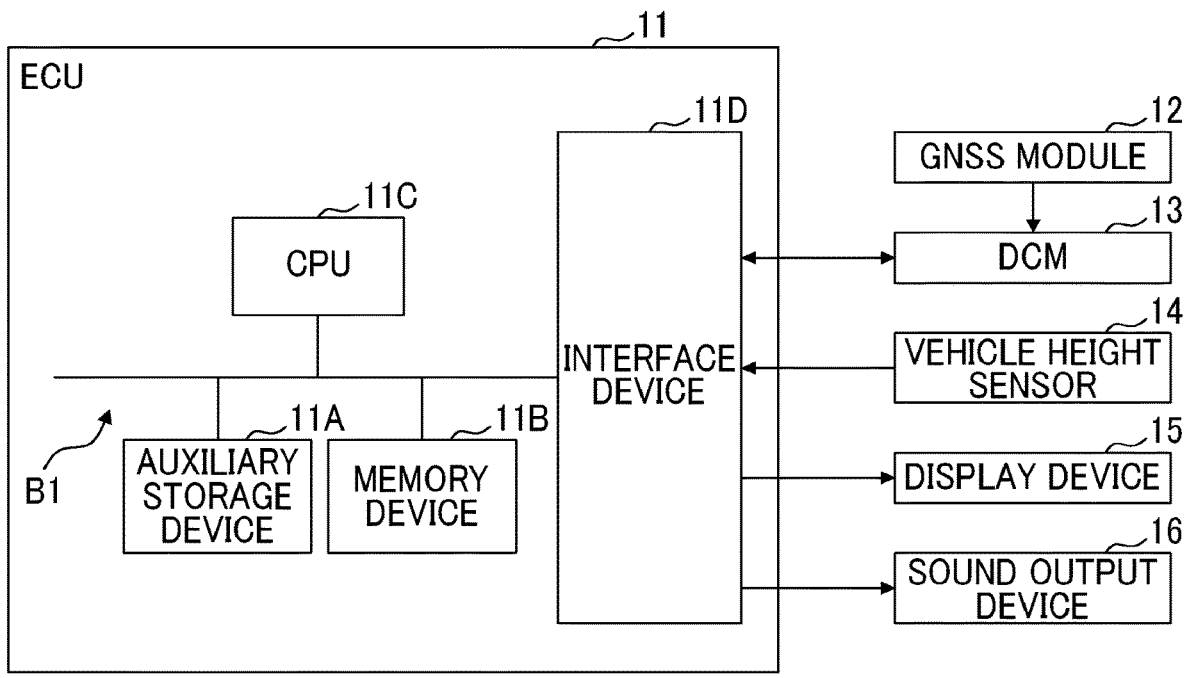
FIG. 2A is a diagram illustrating an example of a hardware configuration of a vehicle.
Figure 2B:
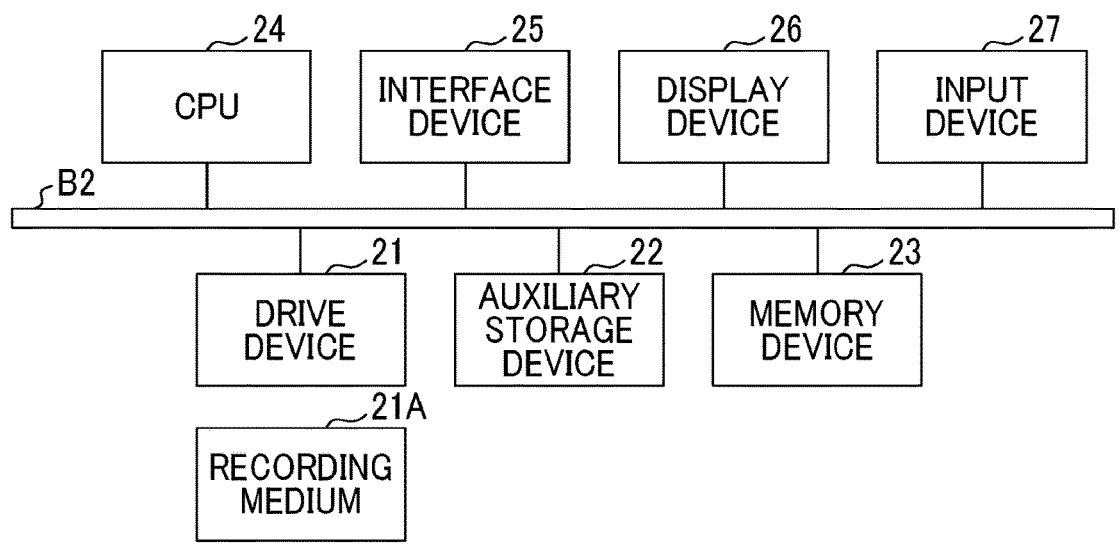
FIG. 2B is a diagram illustrating an example of a hardware configuration of a center server.
Figure 3:
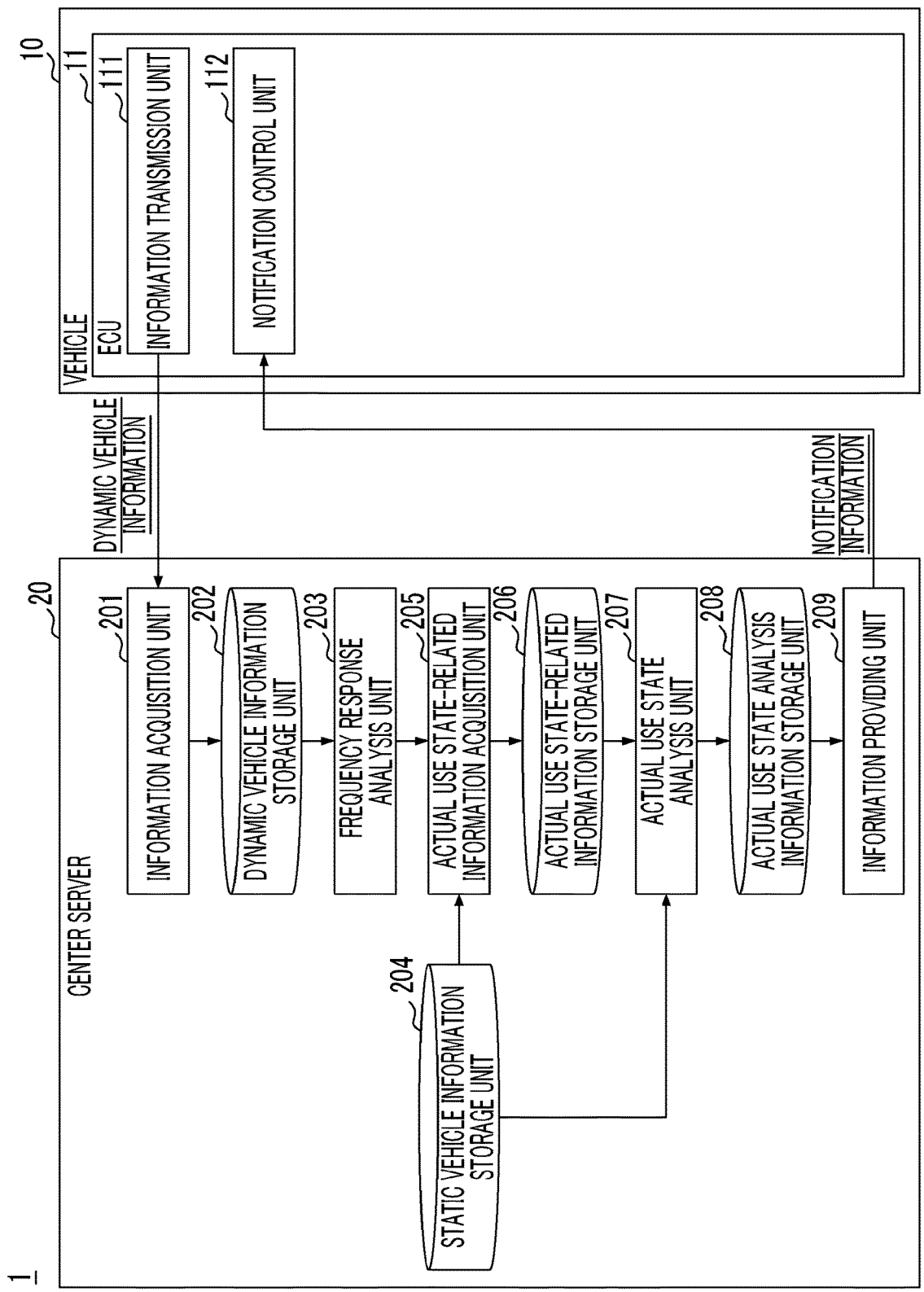
FIG. 3 is a schematic diagram illustrating an example of a functional configuration of an information acquisition system.

FIGS. 2A and 2B are diagrams illustrating an example of a hardware configuration of the information acquisition system 1. Specifically, FIG. 2A is a diagram illustrating an example of a hardware configuration of the vehicle 10, and FIG. 2B is a diagram illustrating an example of a hardware configuration of the center server 20. FIG. 3 is a diagram illustrating an example of a functional configuration of the information acquisition system 1.

Configuration of Vehicle

As illustrated in FIG. 2A, the vehicle 10 includes an electronic control unit (ECU) 11, a global navigation satellite system (GNSS) module 12, a data communication module (DCM) 13, a vehicle height sensor 14, a display device 15, and a sound output device 16.

The ECU 11 is an electronic control unit that performs control regarding various functions of the vehicle 10. The functions of the ECU 11 may be realized by any hardware or a combination of hardware and software. For example, the ECU 11 may be configured by using a microcomputer including an auxiliary storage device 11A, a memory device 11B, a central processing unit (CPU) 11C, and an interface device 11D that are connected to each other via a bus B1.

A program for realizing various functions of the ECU 11 is provided by a dedicated tool connected, via a cable, to a predetermined connector (for example, a data link coupler (DLC)) for external connection that is connected to an on-vehicle network such as a controller area network (CAN) of the vehicle 10. The program is installed into the auxiliary storage device 11A of the ECU 11 from the dedicated tool via the cable, the connector, and the on-vehicle network, in response to a predetermined operation in the dedicated tool. The program may be downloaded from another computer (for example, the center server 20) via the communication network NW, and may be installed into the auxiliary storage device 11A.

The auxiliary storage device 11A is nonvolatile storage means, stores the installed program, and also stores a needed file or data. The auxiliary storage device 11A is, for example, a hard disk drive (HDD) or a flash memory.

The memory device 11B reads the program from the auxiliary storage device 11A, and stores the program thereinto, in a case where there is an instruction for starting the program.

The CPU 11C executes the program stored in the memory device 11B, and realizes various functions of the ECU 11 according to the program.

The interface device 11D is used as an interface connected to, for example, the on-vehicle network or to various sensors and actuators on a one-to-one basis. The interface device 11D may include a plurality of different types of interface devices in accordance with connected targets.

The GNSS module 12 measures a position of the vehicle 10 (host vehicle) mounted with the GNSS module 12 by receiving satellite signals transmitted from three or more, preferably, four or more satellites in the sky over the vehicle 10. Information regarding a position measured by the GNSS module 12, that is, position information of the vehicle 10 is incorporated into the DCM 13 via, for example, a communication line on a one-to-one basis or the on-vehicle network. The information regarding a position measured by the GNSS module 12 may be incorporated into the ECU 11 via, for example, the on-vehicle network.

The DCM 13 is an example of a communication device that is connected to the communication network NW, and performs communication with external apparatuses including the center server 20 via the network NW. The DCM 13 performs transmission and reception of various signals (for example, an information signal and a control signal) with the center server 20. The DCM 13 is communicably connected to, for example, the ECU 11 via the on-vehicle network, and transmits various signals to the outside in response to a request from the ECU 11, or outputs signals received from the outside to the on-vehicle network toward the ECU 11.

The vehicle height sensor 14 is existing measurement means for measuring a physical quantity regarding displacement of a sprung part of the vehicle 10 in the height direction. The vehicle height sensor 14 measures a relative displacement amount between, for example, a suspension device corresponding to an unsprung part and a vehicle body corresponding to a sprung part. In this case, the vehicle height sensor 14 may be, for example, a potentiometer, or an optical type or a magnetic flux detection type displacement sensor. The vehicle height sensor 14 may apply a detection wave such as laser light or an ultrasonic wave to a road surface from the sprung part (for example, a vehicle body), and may measure a distance between the vehicle body and the road surface by receiving a reflected wave (reflected light) from the road surface. Measurement information corresponding to displacement of the sprung part of the vehicle 10 in the height direction, measured by the vehicle height sensor 14, that is, vehicle height displacement information is incorporated into the ECU 11 via a communication line on a one-to-one basis or the on-vehicle network.

The display device 15 is provided in a vehicle cabin of the vehicle 10, and displays various information images regarding the vehicle 10. The display device 15 is a display disposed at a substantially central portion (that is, a center cluster) of an instrument panel provided at a front end portion of the vehicle cabin or a display in a meter panel provided on a driver seat side of the instrument panel. Specifically, as the display device 15, a liquid crystal display or an organic electroluminescence (EL) display may be used.

The sound output device 16 is provided in the vehicle cabin of the vehicle 10, and outputs predetermined sounds (for example, a buzzer sound or a beep sound) or predetermined voices. The sound output device 16 is, for example, a buzzer or a speaker.

As illustrated in FIG. 3, the ECU 11 includes an information transmission unit 111 and a notification control unit 112 as functional units that are realized by executing one or more programs stored in the auxiliary storage device 11A on the CPU 11C.

The information transmission unit 111 acquires the dynamic vehicle information or causes the DCM 13 to acquire the dynamic vehicle information, for example, in a predetermined cycle (for example, every several minutes or every several tens of minutes), or transmits the dynamic vehicle information to the center server 20 via the DCM 13. Specifically, the information transmission unit 111 may transmit signals including identification information (for example, a vehicle index number (VIN) of the vehicle 10 or a vehicle identifier (ID) predefined for each of the vehicles 10) (hereinafter, referred to as "vehicle identification information") for the vehicle 10 as a transmission source, information (for example, a time stamp) (hereinafter, referred to as acquisition date-and-time information) regarding the acquisition date and time of the dynamic vehicle information, and the dynamic vehicle information, to the center server 20. Consequently, the center server 20 can identify (specify) the vehicle 10 as a transmission source of the signals including the dynamic vehicle information or specify the acquisition date and time (acquisition timing) of the dynamic vehicle information.

The function of the information transmission unit 111 may be transferred to the DCM 13.

The dynamic vehicle information transmitted by the information transmission unit 111 includes information (ACC information) regarding an ON or OFF state of an accessory switch (hereinafter, referred to as an "ACC switch") of the vehicle 10, measurement information in the vehicle height sensor 14 as vehicle height displacement information of the vehicle 10, information (hereinafter, referred to as "traveling distance information") regarding a traveling distance of the vehicle 10 in a trip meter, and position information of the vehicle 10. In this case, the vehicle height displacement information included in the dynamic vehicle information is a measurement information group during the certain latest period (for example, for several seconds or several tens of seconds) instead of measurement information at a certain time point. The traveling distance information may be included in transmission target dynamic vehicle information in a form of being restricted to the time at which the ACC information changes, that is, the ACC switch changes from an OFF state to an ON state (hereinafter, referred to as the "time of ACC-ON") or the ACC switch changes from an ON state to an OFF state (hereinafter, referred to as the "time of ACC-OFF").

The notification control unit 112 controls the display device 15 or the sound output device 16 of the vehicle 10 in response to a control command from the center server 20, so as to perform a notification regarding the vehicle 10 on a user (at least one occupant of a driver and a passenger) of the vehicle 10. Details thereof will be described later.

Configuration of Center Server

The functions of the center server 20 may be realized by any hardware or a combination of hardware and software. As illustrated in FIG. 2B, for example, the center server 20 includes a drive device 21, an auxiliary storage device 22, a memory device 23, a CPU 24, an interface device 25, a display device 26, and an input device 27 which are connected to each other via a bus B2.

A program for realizing various functions of the center server 20 is provided by a portable recording medium 21A such as a compact disc read only memory (CD-ROM), a digital versatile disc read only memory (DVD-ROM), or a Universal Serial Bus (USB) memory. When the recording medium 21A recording the program is set in the drive device 21, the program is installed into the auxiliary storage device 22 from the recording medium 21A via the drive device 21. The program may be downloaded from another computer via a communication network, and may be installed into the auxiliary storage device 22.

The auxiliary storage device 22 stores the installed program, and also stores a needed file or data.

The memory device 23 reads the program from the auxiliary storage device 22, and stores the program thereinto, in a case where there is an instruction for starting the program.

The CPU 24 executes various programs stored in the memory device 23, and realizes various functions related to the center server 20 according to the programs.

The interface device 25 is used as an interface connected to a communication network (for example, the communication network NW).

The display device 26 displays, for example, a graphical user interface (GUI) according to a program executed by the CPU 24.

The input device 27 is used for a worker or a manager of the center server 20 to input various operation instructions regarding the center server 20.

As illustrated in FIG. 3, the center server 20 includes an information acquisition unit 201, a frequency response analysis unit 203, an actual use state-related information acquisition unit 205, an actual use state analysis unit 207, and an information providing unit 209 as functional units that are realized by executing one or more programs stored in the auxiliary storage device 22 on the CPU 24. The center server 20 uses a dynamic vehicle information storage unit 202, a static vehicle information storage unit 204, an actual use state-related information storage unit 206, and an actual use state analysis information storage unit 208. The dynamic vehicle information storage unit 202, the static vehicle information storage unit 204, the actual use state-related information storage unit 206, and the actual use state analysis information storage unit 208 may be realized by using, for example, the auxiliary storage device 22, or an external storage device communicably connected to the center server 20.

The information acquisition unit 201 acquires the dynamic vehicle information received from each vehicle 10, and stores (accumulates) the dynamic vehicle information into the dynamic vehicle information storage unit 202. Specifically, the information acquisition unit 201 stores the dynamic vehicle information received from the vehicle 10 into the dynamic vehicle information storage unit 202 as a record associated with corresponding vehicle identification information and acquisition date-and-time information.

As described above, the dynamic vehicle information storage unit 202 stores the dynamic vehicle information received from the vehicle 10. Specifically, the dynamic vehicle information storage unit 202 may accumulate a record including the vehicle identification information, the acquisition date-and-time information, and the dynamic vehicle information, and may thus hold a record group (that is, a database) of the dynamic vehicle information acquired from the vehicles 10. Regarding the dynamic vehicle information storage unit 202, a dedicated dynamic vehicle information storage unit may be provided in each of the vehicles 10, and the history of a record including acquisition date-and-time information and dynamic vehicle information for each vehicle 10, that is, a record group may be held in the dynamic vehicle information storage unit.

The frequency response analysis unit 203 performs frequency response analysis on vehicle height displacement information (specifically, a vehicle height displacement information group) during the use of the vehicle 10 (that is, during traveling) in the relatively short first period (for example, a period corresponding to one trip of the vehicle 10). The frequency response analysis unit 203 outputs a frequency response (hereinafter, a "displacement response") regarding displacement of the sprung part of the vehicle 10 in the height direction, and feature information regarding the displacement response, for example, a peak frequency fp and a peak gain Gp which will be described later. In this case, the frequency response analysis unit 203 may collectively perform frequency response analysis on, for example, all vehicle height displacement information groups corresponding to the target first period (for example, one trip). The frequency response analysis unit 203 may perform frequency response analysis on, for example, each of a plurality of vehicle height displacement information groups periodically acquired at different timings in the target first period, and may acquire the peak frequency fp and the peak gain Gp through a statistical process (for example, averaging process) based on each result of the frequency response analysis.

Figure 4:
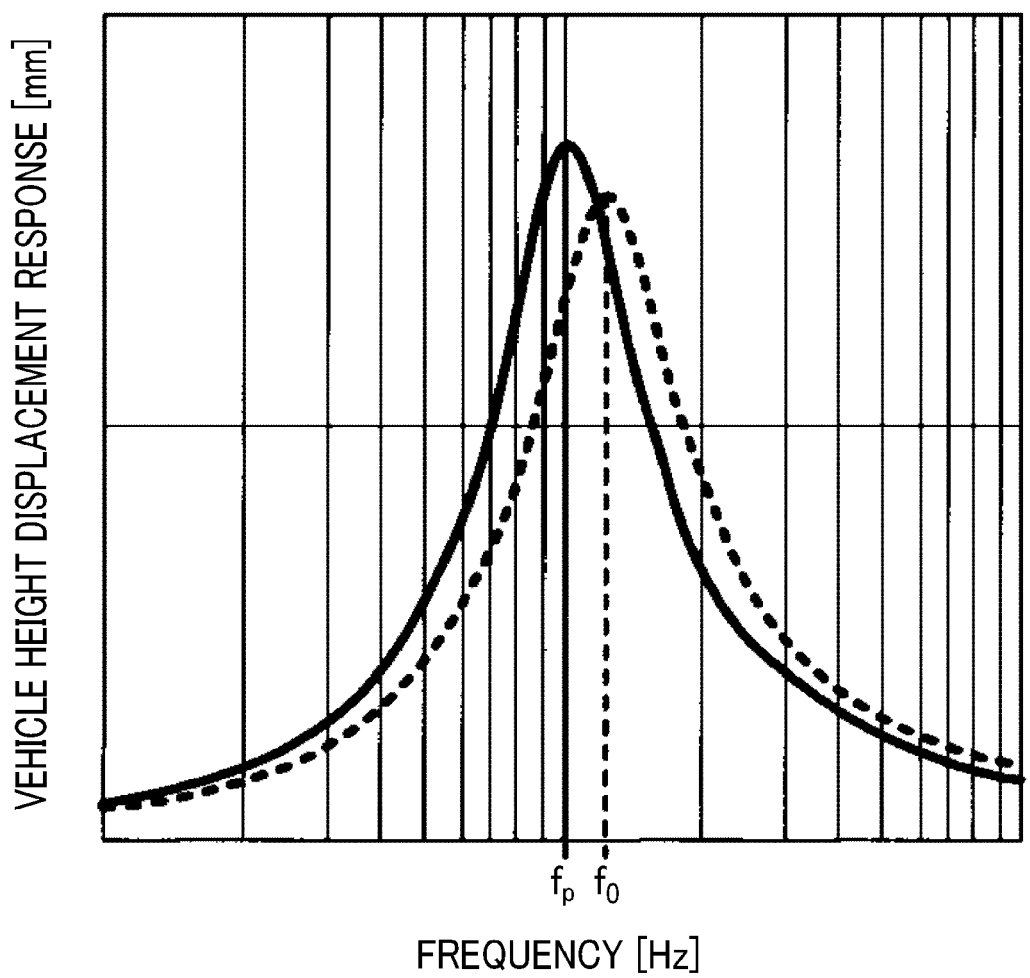
FIG. 4 is a diagram illustrating an example of a frequency response diagram representing a displacement response.

For example, FIG. 4 is a diagram illustrating an example of a frequency response diagram representing a displacement response of the vehicle 10.

As illustrated in FIG. 4 (solid line), the displacement response of the vehicle 10 has a peak of a gain (peak gain Gp) that is remarkable at a specific frequency, that is, the peak frequency fp. The peak frequency fp changes depending on the mass of the sprung part (hereinafter, referred to as the "sprung mass") during the use of the vehicle 10, that is, a loading state of a loaded object including an occupant or luggage of the vehicle 10 (hereinafter, simply referred to as a "loaded object"). The peak gain Gp changes depending on a road surface state (for example, the degree of flatness, the degree of unevenness, and the degree of waviness of the road surface) of a road during the use (traveling) of the vehicle 10.

Referring to FIG. 3 again, the static vehicle information storage unit 204 stores static information of the vehicle 10, that is, information specific to the vehicle 10 or quasi-static information, that is, information (hereinafter, collectively referred to as "static vehicle information") that does not change within a short period of time, for each of the vehicles 10. The static vehicle information may include, for example, vehicle identification information of the vehicle 10, information regarding a vehicle model and a grade of the vehicle 10, information (hereinafter, referred to as "reference mass information") regarding the mass (hereinafter, referred to as the "reference mass") M0 used as a reference for loading states of an occupant and luggage of the vehicle 10, and information (hereinafter, referred to as "suspension specification information") regarding a specification including a spring constant or a damping coefficient of the suspension device of the vehicle 10. In this case, the reference mass M0 included in the reference mass information may be the mass of when the vehicle 10 is empty, acquired from a catalog or a web page of a maker corresponding to a vehicle model and a grade of the target vehicle 10. The reference mass M0 included in the reference mass information may be the mass of when the vehicle 10 is empty, acquired based on design information from a maker of the vehicle 10. The reference mass M0 included in the reference mass information may be the minimum value of the mass during the use of the vehicle 10, acquired in the past by the actual use state-related information acquisition unit 205 which will be described later, with respect to the vehicle 10 with the identical vehicle model and grade among the vehicles 10, that is, the mass of the vehicle 10 corresponding to the minimum loading state. In this case, as illustrated in FIG. 4 (dashed line), a peak frequency f0 of the vehicle 10 corresponding to the minimum loading state is higher than the peak frequency fp during the use of another vehicle 10 with the identical vehicle model and grade. The suspension specification information in the static vehicle information storage unit 204 may be acquired based on design information from a maker of the vehicle 10. The static vehicle information may include information (for example, a user ID) for identifying a user of the vehicle 10, information (hereinafter, referred to as "delivery date information") regarding the date on which the vehicle 10 is delivered to the user, and the date (hereinafter, referred to as "maintenance date information") on which maintenance such as vehicle inspection for the vehicle 10 was performed.

The actual use state-related information acquisition unit 205 (an example of a first acquisition unit) acquires, for each of the vehicles 10, information (actual use state-related information) regarding an actual use state of the vehicle 10 in the relatively short first period by performing depth calculation based on information output from the frequency response analysis unit 203 and the static vehicle information stored in the static vehicle information storage unit 204. The actual use state-related information acquisition unit 205 stores (accumulates), for each of the vehicles 10, the acquired actual use state-related information in the target first period (for example, one trip), and information (hereinafter, referred to as "period traveling distance information") regarding a traveling distance in the target first period corresponding to the actual use state-related information, into the actual use state-related information storage unit 206. Specifically, the actual use state-related information acquisition unit 205 stores the actual use state-related information into the actual use state-related information storage unit 206 as a record associated with information (for example, a trip ID defined for each trip of the vehicle 10) (hereinafter, referred to as "period identification information") for identifying the target first period, information (hereinafter, referred to as "use date-and-time information") regarding the date and time corresponding to the first period, and period traveling distance information corresponding to the actual use state-related information.

For example, the actual use state-related information acquisition unit 205 calculates the sprung mass Mp (an example of first information) during the use of the vehicle 10 in a short period based on the peak frequency fp during the use of the vehicle 10 in the target first period, and the spring constant and the damping coefficient of the suspension device of the vehicle 10. In other words, the actual use state-related information acquisition unit 205 acquires the sprung mass Mp during the use of the vehicle 10 as the actual use state-related information in the target first period. In this case, the actual use state-related information acquisition unit 205 may use a predetermined map, table, or conversion expression for outputting the sprung mass Mp with the peak frequency fp during the use of the vehicle 10, and the spring constant and the damping coefficient of the suspension device of the vehicle 10 as input information. Hereinafter, this will be the same for a case of acquiring information regarding a road surface state. The actual use state-related information acquisition unit 205 may acquire the mass (hereinafter, referred to as the loaded mass) $\Delta M$ (=Mp−M0) corresponding to a loaded object of the vehicle 10 as the actual use state-related information in the target first period based on the sprung mass Mp and the reference mass M0.

For example, the actual use state-related information acquisition unit 205 acquires information (hereinafter, referred to as "road surface information") (an example of first information) regarding a road surface state of a road during the use of the vehicle 10 in a short period based on the peak gain Gp during the use of the vehicle 10 in the target first period, and the spring constant or the damping coefficient of the suspension device of the vehicle 10. In other words, the actual use state-related information acquisition unit 205 acquires road surface information based on the peak gain Gp in the first period as the actual use state-related information in the target first period. The road surface information is, for example, information regarding a road surface state rank of a plurality of stages representing the degree of flatness of a road surface, and there may be an aspect in which, as a number representing a rank increases, a road surface state worsens, that is, the degree of flatness becomes lower. In this case, the actual use state-related information acquisition unit 205 acquires any rank corresponding to the peak gain Gp during the use of the vehicle 10 among ranks of the stages defined in the road surface state rank.

The actual use state-related information storage unit 206 stores the actual use state-related information acquired by the actual use state-related information acquisition unit 205 as described above. Specifically, the actual use state-related information storage unit 206 may hold a record group (that is, a database) of actual use state-related information regarding the vehicles 10 by accumulating a record including the vehicle identification information, the period identification information, the use date-and-time information, the period traveling distance information, and the actual use state-related information. The actual use state-related information storage unit 206 may be provided as a dedicated actual use state-related information storage unit in each of the vehicles 10, and may hold a record group regarding actual use state-related information, including period identification information, use date-and-time information, period traveling distance information, and actual use state-related information of the target vehicle 10.

The actual use state analysis unit 207 (an example of a second acquisition unit) analyzes an actual use state of the vehicle 10 in the relatively long second period based on history data of the actual use state-related information, that is, the record group of the actual use state-related information held in the actual use state-related information storage unit 206. The actual use state analysis unit 207 acquires information regarding an actual use state of the vehicle 10 in the relatively long second period, that is, actual use state analysis information. The actual use state analysis unit 207 stores the acquired actual use state analysis information into the actual use state analysis information storage unit 208 for each of the vehicles 10. In this case, the actual use state analysis unit 207 may update old actual use state analysis information of the target vehicle 10 held in the actual use state analysis information storage unit 208 to the acquired new actual use state analysis information of the vehicle 10.

For example, the actual use state analysis unit 207 acquires information (an example of second information) representing the actual use state of the vehicle 10 regarding a loading state (hereinafter, referred to as a "total loading state") of loaded objects including an occupant and luggage of the vehicle 10 in a relatively long period (for example, a period from delivery of the vehicle 10 or a period after maintenance of the vehicle 10 such as the previous vehicle inspection was performed), based on a record group including the sprung mass Mp, the loaded mass ΔM, and the traveling distance held in the actual use state-related information storage unit 206. In other words, the actual use state analysis unit 207 acquires information representing the actual use state of the vehicle 10 regarding a total loading state of the vehicle 10 based on the sprung mass Mp or the loaded mass ΔM and the traveling distance in each first period included in the second period as the actual use state analysis information in the target second period. Specifically, the actual use state analysis unit 207 may calculate a product of the sprung mass Mp or the loaded mass ΔM and the traveling distance for each first period included in the target second period as the actual use state analysis information. The actual use state analysis unit 207 may acquire a cumulative value (a sum total value) of products of the sprung mass Mp or the loaded mass ΔM and the traveling distance for each first period as the actual use state analysis information. Consequently, the center server 20 (or a manager or an operator thereof) can understand to what extent a load (mechanical fatigue) is accumulated in the vehicle 10 due to a total loading state of the vehicle 10. This is because, as the loaded mass on the vehicle 10 is increased, a load applied to the vehicle 10 is increased, and, as a traveling distance is increased, an accumulated load is increased due to a state in which the loaded load is applied being continued.

For example, the actual use state analysis unit 207 acquires information (an example of second information) representing an actual use state of the vehicle 10 regarding a road surface state of a road during the use of the vehicle 10 in a relatively long period (for example, a period from delivery of the vehicle 10 or a period after maintenance of the vehicle 10 such as the previous vehicle inspection was performed) based on a record group including the road surface state rank and the traveling distance held in the actual use state-related information storage unit 206. In other words, the actual use state analysis unit 207 acquires information representing the actual use state of the vehicle 10 regarding a road surface state of a road during the use of the vehicle 10 based on the road surface state rank and the traveling distance in each first period included in the second period as the actual use state analysis information in the target second period. Specifically, the actual use state analysis unit 207 may calculate a product of a number representing the road surface state rank and the traveling distance for each first period included in the target second period as the actual use state analysis information. The actual use state analysis unit 207 may acquire a cumulative value (a sum total value) of products of a number representing the road surface state rank and the traveling distance for each first period as the actual use state analysis information. Consequently, the center server 20 (or a manager or an operator thereof) can understand to what extent a load (mechanical fatigue) is accumulated in the vehicle 10 in a period from delivery of the vehicle 10 or a period after maintenance of the vehicle 10 such as the previous vehicle inspection was performed due to a road surface state of a road during the use (that is, traveling) of the vehicle 10. This is because, as a road surface state of a road worsens, a load applied to the vehicle 10 is increased, and, as a traveling distance is increased, an accumulated load is increased due to a state in which a load from the road surface is applied being continued.

For example, the actual use state analysis unit 207 acquires information (an example of second information) regarding an actual use state of the vehicle 10 regarding a loading state (hereinafter, referred to as, a "luggage loading state") of luggage on the vehicle 10 in a relatively long period (for example, the latest several weeks or a period in which the vehicle 10 recently traveled over a predetermined distance (for example, 100 kilometers)), based on a record group including the sprung mass Mp, the loaded mass ΔM, and the traveling distance held in the actual use state-related information storage unit 206. In other words, the actual use state analysis unit 207 acquires information representing the actual use state of the vehicle 10 regarding a luggage loading state of the vehicle 10 during the use of the vehicle 10 based on the sprung mass Mp, the loaded mass ΔM, and the traveling distance in each first period included in the second period as the actual use state analysis information in the target second period. Specifically, first, the actual use state analysis unit 207 estimates the number of occupants during the use of the vehicle 10 corresponding to all records included in the target second period. In this case, the number of occupants of the vehicle 10 in the first period in each record may be estimated based on the loaded mass ΔM. Specifically, in a case of the vehicle 10 of which a riding capacity is five persons, a mass range including the loaded mass ΔM may be set in advance in five stages from the number of occupants of one person to the number of occupants of five persons, and the number of occupants may be defined depending on a stage of a mass range including the loaded mass ΔM. Next, with respect to all records included in the target second period, the actual use state analysis unit 207 acquires (calculates) a difference between the minimum loaded mass ΔM among the latest record groups from delivery of the vehicle 10 and the loaded mass ΔM in each record, extracted in advance for each number of occupants, as the mass of luggage (hereinafter, referred to as the "luggage mass") ΔMb loaded on the vehicle 10 in the target first period. With respect to all of the records included in the target second period, the actual use state analysis unit 207 determines whether or not the acquired luggage mass ΔMb exceeds the minimum physical quantity Mth causing a predefined reaction according to a traveling distance of the vehicle 10, and acquires a frequency (hereinafter, referred to as a "luggage excess frequency") in which the luggage mass ΔMb exceeds the minimum physical quantity Mth causing a reaction among all of the records, as the actual use state analysis information. The minimum physical quantity Mth causing a reaction is a parameter for determining whether or not unneeded luggage is mounted on the vehicle 10, such as luggage merely placed on the vehicle 10 at all times, and is set to become larger as a traveling distance is increased. This is because, in a case where a traveling distance is long, a long journey in leisure or the like is supposed, and thus needed luggage tends to increase in the first place. Consequently, the center server 20 (or a manager or an operator thereof) can estimate to what extent a user may be carrying unneeded luggage during the use (that is, traveling) of the vehicle 10.

The number of occupants of the vehicle 10 may be acquired based on, for example, known image recognition on an image obtained by an internal camera mounted on the vehicle 10, and may be acquired based on an input value of the number of occupants that is input by a user via a graphical user interface (GUI) displayed on the display device 15 of the vehicle 10 at the time of ACC-ON of the vehicle 10. In this case, information regarding the number of occupants may be transmitted to the center server 20 from the vehicle 10 in a form of being included in the dynamic vehicle information. Information regarding the number of occupants during the use of the vehicle 10 in the target first period may be included in each record of the actual use state-related information held in the actual use state-related information storage unit 206. Consequently, the actual use state analysis unit 207 can recognize the number of occupants of the vehicle 10 corresponding to each record of the actual use state-related information.

The actual use state analysis information storage unit 208 may hold a record group of actual use state-related information regarding the vehicles 10 by accumulating a record including vehicle identification information and actual use state analysis information of each of the vehicles 10. The actual use state analysis information storage unit 208 may be provided as a dedicated actual use state analysis information storage unit in each of the vehicles 10, and may hold actual use state analysis information of each target vehicle 10.

For example, FIG. 5 is a flowchart schematically illustrating an example of a process in which the center server 20 (the frequency response analysis unit 203, the actual use state-related information acquisition unit 205, and the actual use state analysis unit 207) acquires actual use state-related information and actual use state analysis information. The process illustrated in the flowchart may be performed as, for example, a batch process on a record group of dynamic vehicle information acquired from the previous process to the present process in each process cycle (for example, two weeks or one month) that is relatively long, with respect to each of the vehicles 10.

In step S102, the frequency response analysis unit 203 acquired record data as data corresponding to one trip from a target record group of the target vehicle 10 stored in the dynamic vehicle information storage unit 202. Specifically, the frequency response analysis unit 203 acquires a plurality of pieces of record data from the time of ACC-ON to the subsequent time of ACC-OFF based on ACC information, and proceeds to step S104. In a case where the frequency response analysis unit 203 determines that the vehicle 10 is not traveling based on detail information of the record data from the time of ACC-ON to the time of ACC-OFF, the frequency response analysis unit 203 may exclude the record data from the time of ACC-ON to the time of ACC-OFF, from a target of the present process. This is because the vehicle 10 is not used in an aspect of traveling, and thus it is meaningless to acquire information regarding an actual use state of the vehicle 10.

In step S104, the frequency response analysis unit 203 performs frequency response analysis based on the acquired record data corresponding to one trip, and proceeds to step S106.

In step S106, the frequency response analysis unit 203 acquires the sprung mass Mp and the loaded mass ΔM of the vehicle 10 in the target one trip based on the peak frequency fp obtained through the frequency response analysis, and proceeds to step S108.

In step S108, the frequency response analysis unit 203 acquires a road surface state rank of the vehicle 10 in the target one trip based on the peak gain Gp obtained through the frequency response analysis, and proceeds to step S110.

The processes in steps S108 and S110 may be reversed to each other in terms of process order, and may be performed in parallel to each other.

In step S110, the actual use state-related information acquisition unit 205 registers and stores actual use state-related information in the target one trip, that is, the sprung mass Mp, the loaded mass ΔM, and the road surface state rank in the actual use state-related information storage unit 206 as a record. Specifically, as described above, the actual use state-related information acquisition unit 205 registers a record including the vehicle identification information, the period identification information such as a trip ID, the use date-and-time information corresponding to the target trip, the sprung mass Mp, the loaded mass ΔM, the road surface state rank, and the period traveling distance information, in the actual use state-related information storage unit 206, and proceeds to step S112.

In step S112, the actual use state-related information acquisition unit 205 determines whether or not the batch process on all records of the target record group has been completed. In a case where an unprocessed record remains in the target record group, the actual use state-related information acquisition unit 205 returns to step S102, repeatedly performs the process starting from step S102, and proceeds to step S114 in a case where there is no unprocessed record in the target record group, that is, the batch process on all of the records has been completed.

In step S114, the actual use state analysis unit 207 acquires actual use state analysis information as described above based on the actual use state-related information in each trip included in the target second period, stored (registered) in the actual use state-related information storage unit 206, and proceeds to step S116.

In step S116, the actual use state analysis unit 207 registers the acquired actual use state analysis information in the actual use state analysis information storage unit 208 as described above, and finishes the present process.

Referring to FIG. 3 again, the information providing unit 209 provides assistance information (advice) regarding the use of the vehicle 10 to a user of the vehicle 10 based on the actual use state analysis information registered in the actual use state analysis information storage unit 208. In this case, the target vehicle 10 may be all of the vehicles 10, and may be the vehicle 10 corresponding to a user registered in advance as a user who wants to receive an advice. A timing at which the information providing unit 209 provides information may be a predetermined timing (for example, a timing at which the target vehicle 10 is subjected to ACC-ON after the actual use state analysis information is updated), for example, after the actual use state analysis information in the actual use state analysis information storage unit 208 is updated through the process in the flowchart of FIG. 5.

For example, the information providing unit 209 provides assistance information (hereinafter, referred to as "maintenance assistance information") regarding maintenance of the vehicle 10 to a user of the vehicle 10 based on the actual use state analysis information of the target vehicle 10 registered in the actual use state analysis information storage unit 208. Specifically, the information providing unit 209 outputs maintenance assistance information for the user of the vehicle 10 based on information representing an actual use state of the vehicle 10 regarding a total loading state or information representing an actual use state of the vehicle 10 regarding a road surface state of a road, registered in the actual use state analysis information storage unit 208, and transmits the maintenance assistance information to the vehicle 10. The maintenance assistance information may include, for example, information regarding a maintenance recommended time period for the whole of the vehicle 10 or each part of the vehicle 10. This is because the information representing an actual use state of the vehicle 10 regarding a total loading state or a road surface state of a road registered in the actual use state analysis information storage unit 208 represents to what extent a load (mechanical fatigue) is accumulated in the vehicle 10. In this case, the notification control unit 112 of the vehicle 10 controls the display device 15 or the sound output device 16 to notify the user of the maintenance assistance information, in response to reception of the maintenance assistance information from the center server 20. Consequently, the user of the vehicle 10 can understand contents of the assistance information, and can use the assistance information for the future maintenance of the vehicle 10.

For example, the information providing unit 209 provides assistance information (hereinafter, referred to as "fuel efficiency improvement assistance information") regarding fuel efficiency of the vehicle 10 to a user of the vehicle 10 based on the actual use state analysis information of the target vehicle 10 registered in the actual use state analysis information storage unit 208. Specifically, the information providing unit 209 outputs the fuel efficiency improvement assistance information for the user of the vehicle 10 based on information regarding an actual use state of the vehicle 10 regarding a luggage loading state registered in the actual use state analysis information storage unit 208, and transmits the fuel efficiency improvement assistance information to the vehicle 10. The fuel efficiency improvement assistance information may include information regarding whether or not luggage loaded on the target vehicle 10 is relatively much (that is, information regarding whether or not unneeded luggage may be loaded on the vehicle 10), or information for prompting a user to reduce luggage of the vehicle 10 on a normally loaded luggage basis in a case where the luggage is relatively much. This is because information (for example, a luggage excess frequency) representing an actual use state of the vehicle 10 regarding a luggage loading state registered in the actual use state analysis information storage unit 208 represents to what extent the user may be carrying unneeded luggage. In this case, the notification control unit 112 of the vehicle 10 controls the display device 15 or the sound output device 16 to notify the user of the fuel efficiency improvement assistance information, in response to reception of the fuel efficiency improvement assistance information from the center server 20. Consequently, the user of the vehicle 10 can understand contents of the assistance information, and can use the assistance information for the future fuel efficiency improvement of the vehicle 10. The fuel efficiency improvement assistance information may include information (hereinafter, referred to as "fuel efficiency information") regarding an actual fuel consumption rate of the vehicle 10. The fuel efficiency improvement assistance information may include, for example, fuel efficiency information in a case where luggage of the vehicle 10 is relatively little and fuel efficiency information in a case where the luggage is relatively much. In this case, the notification control unit 112 of the vehicle 10 controls the display device 15 or the sound output device 16 to notify the user of the fuel efficiency information along with information regarding whether or not luggage loaded on the target vehicle 10 is relatively much, in response to reception of the fuel efficiency improvement assistance information from the center server 20. Consequently, the user of the vehicle 10 can understand to what extent a luggage loading state influences the fuel efficiency of the vehicle 10. In this case, the fuel efficiency information of the vehicle 10 may be transmitted to the center server 20 from the vehicle 10 in a form of being included in the dynamic vehicle information. The fuel efficiency information during the use of the vehicle 10 in the target first period may be included in each record of actual use state-related information held in the actual use state-related information storage unit 206. Consequently, the actual use state analysis unit 207 can recognize the fuel efficiency information of the vehicle 10 corresponding to each record of the actual use state-related information.

The information providing unit 209 may provide one of the maintenance assistance information and the fuel efficiency improvement assistance information to a user of the target vehicle 10. In other words, the information providing unit 209 may provide at least one of the maintenance assistance information and the fuel efficiency improvement assistance information to a user of the target vehicle 10. The information providing unit 209 may provide assistance information to a user of the vehicle 10 in methods other than a method of providing the assistance information to the vehicle 10. For example, the information providing unit 209 may transmit assistance information to a user terminal in a push form via a predetermined application installed in the user terminal (for example, a portable terminal such as a smart phone, a tablet terminal, or a laptop computer, or a stationary terminal such as a desktop computer) of a user of the vehicle 10 instead of or in addition to the vehicle 10. The information providing unit 209 may transmit assistance information to a mail address of a user of the vehicle 10 or an account of a social networking service (SNS) of the user, instead of or in addition to the vehicle 10. Consequently, the user can understand the assistance information via the user terminal such as a smart phone or a tablet terminal used thereby, and thus it is possible to achieve a similar effect.

Operation of Present Embodiment

Next, a description will be made of an operation of the information acquisition system 1 (center server 20) according to the present embodiment.

In the present embodiment, the actual use state-related information acquisition unit 205 acquires first information (actual use state-related information) regarding an actual use state of the vehicle 10 in a relatively short period based on displacement information of the sprung part of the vehicle 10 in the height direction, acquired by the vehicle 10. The actual use state analysis unit 207 acquires second information regarding an actual use state of the vehicle 10 in a relatively long period based on the first information acquired by the actual use state-related information acquisition unit 205.

Consequently, the center server 20 can acquire the first information regarding an actual use state of the vehicle 10 regarding a luggage loading state or a road surface state of a road on which the vehicle 10 is traveling in a relatively short period (for example, in one trip) during the use (traveling) of the vehicle 10 by using the displacement information (vehicle height displacement information) of the sprung part in the height direction, acquired when the vehicle 10 is actually used. This is because an actual use state of the vehicle 10, such as a loading state of an occupant or luggage of the vehicle 10 or a road surface state of a road on which the vehicle 10 is traveling is reflected in a displacement state of the sprung part in the height direction. The center server 20 can acquire the second information regarding an actual use state of the vehicle 10 in a relatively long period by, for example, accumulating the first information regarding an actual use state of the vehicle 10 in a relatively short period. Therefore, the center server 20 can acquire information for understanding an actual use state of the vehicle 10, specifically, the second information for understanding an actual use state of the vehicle 10 in a relatively long period.

In the present embodiment, the actual use state-related information acquisition unit 205 may acquire, as the first information, the mass of the sprung part during the use of the vehicle 10 in a relatively short period based on vehicle height displacement information, and the actual use state analysis unit 207 may acquire the second information representing an actual use state of the vehicle 10 regarding a loading state of a loaded object of the vehicle 10 in a relatively long period based on the mass of the sprung part acquired by the actual use state-related information acquisition unit 205.

Consequently, for example, the center server 20 can acquire the second information for understanding an actual use state regarding a loading state of a loaded object such as an occupant or luggage of the vehicle 10 in a relatively long period by acquiring the mass of the sprung part during the use of the vehicle 10 in a relatively short period based on the displacement information of the sprung part in the height direction.

In the present embodiment, the actual use state-related information acquisition unit 205 may acquire the mass of the sprung part based on a peak frequency in a frequency response of the vehicle height displacement information.

Consequently, for example, the center server 20 can acquire the mass of the sprung part during the use of the vehicle 10 in a relatively short period as the first information by using frequency response analysis on the displacement information of the sprung part in the height direction.

In the present embodiment, the actual use state-related information acquisition unit 205 may acquire the first information regarding a road surface state of a road during the use of the vehicle 10 in a relatively short period based on the vehicle height displacement information, and the actual use state analysis unit 207 may acquire the second information representing an actual use state of the vehicle 10 regarding a road surface state of a road during the use of the vehicle 10 in a relatively long period based on the first information acquired by the actual use state-related information acquisition unit 205.

Consequently, for example, the center server 20 can acquire the second information regarding an actual use state of the vehicle 10 regarding a road surface state of a road during the use of the vehicle 10 in a relatively long period by acquiring the information regarding a road surface state of a road during the use of the vehicle 10 in a relatively short period based on the displacement information of the sprung part in the height direction.

In the present embodiment, the actual use state-related information acquisition unit 205 may acquire the first information regarding a road surface state of a road during the use of the vehicle 10 in a relatively short period based on a gain of a frequency response of the vehicle height displacement information.

Consequently, for example, the center server 20 can acquire the first information regarding a road surface state of a road during the use of the vehicle 10 in a relatively short period by using frequency analysis on displacement information of the sprung part in the height direction.

In the present embodiment, the actual use state-related information acquisition unit 205 may acquire the first information regarding an actual use state of the vehicle 10 in each period from stating to stoppage after traveling of the vehicle 10, and the actual use state analysis unit 207 may acquire the second information regarding an actual use state of the vehicle 10 based on the first information in each period acquired by the actual use state-related information acquisition unit 205 and a traveling distance in the period.

Consequently, for example, the center server 20 can acquire the second information regarding an actual use state of the vehicle 10 based on the first information regarding an actual use state of the vehicle 10 in a period from starting to stoppage after traveling of the vehicle 10, that is, in one trip, and a traveling distance in one trip.

In the present embodiment, the information providing unit 209 may provide at least one of information regarding fuel efficiency improvement of the vehicle 10 and information regarding maintenance of the vehicle 10 to a user of the vehicle 10 based on the second information regarding an actual use state of the vehicle 10 in a relatively long period, acquired by the actual use state analysis unit 207.

Consequently, for example, the center server 20 can give an advice on fuel efficiency improvement or maintenance to a user of the vehicle 10 in a form of being appropriate for an actual use state by using the second information regarding an actual use state of the vehicle 10 in a relatively long period, acquired by the actual use state analysis unit 207.

As mentioned above, the embodiment of the present disclosure has been described in detail, but the scope of the present disclosure is not limited to the specific embodiment, and various modifications and alterations may occur within the scope of the spirit of the present disclosure disclosed in the claims.

For example, in the embodiment, the function of the information providing unit 209 of the center server 20 may be transferred to each vehicle 10 (for example, the ECU 11 (an example of an information providing apparatus)) or a user terminal (an example of an information providing apparatus) used by a user of the vehicle 10. In this case, the center server 20 transmits actual use state analysis information of the target vehicle 10 registered in the actual use state analysis information storage unit 208, to the vehicle 10 or a preregistered user terminal of the user of the vehicle 10. Consequently, for example, a predetermined application that is installed in the ECU 11 of the vehicle 10 or the user terminal and is executed on the CPU can realize the function of the information providing unit 209 based on the actual use state analysis information of the target vehicle 10 transmitted from the center server 20.

In the embodiment and modification example, instead of the center server 20, each vehicle 10 (for example, the ECU 11 (an example of an information providing apparatus)) or a user terminal (an example of an information providing apparatus) used by a user of the vehicle 10 may acquire the actual use state-related information and the actual use state analysis information. In other words, the functions of the actual use state-related information acquisition unit 205 and the actual use state analysis unit 207 of the center server 20 may be transferred to each of the vehicles 10 or a user terminal of a user of the vehicle 10. In this case, the user terminal may acquire dynamic vehicle information from the corresponding vehicle 10 of the user via the center server 20. For example, in a case where the user terminal is a portable terminal such as a smart phone or a tablet terminal, the user terminal may acquire the dynamic vehicle information from the vehicle 10 by using short-range communication in a predetermined method such as Bluetooth (registered trademark) communication or WiFi (registered trademark) communication.

What is claimed is:

1. An apparatus comprising:
    circuitry configured to:
    calculate first information regarding a first actual use state of a vehicle in a first period based on displacement information of a sprung part of the vehicle in a height direction acquired by the vehicle; and
    calculate second information regarding a second actual use state of the vehicle in a second period that includes a plurality of the first periods,
    wherein the second information is calculated using the first information of the plurality of first periods.

2. The apparatus according to claim 1, wherein the circuitry is configured to:
    calculate mass of the sprung part during use of the vehicle in the first period as the first information regarding the first actual use state of the vehicle based on the displacement information; and
    calculate a loading state of a loaded object on the vehicle in the second period as the second information regarding the second actual use state of the vehicle based on the mass of the sprung part calculated for the plurality of first periods.

3. The apparatus according to claim 2, wherein the circuitry is configured to calculate the mass of the sprung part based on a peak frequency in a frequency response of the displacement information.

4. The apparatus according to claim 1, wherein the circuitry is configured to:
    calculate a road surface state of a road during the use of the vehicle in the first period as the first information regarding the first actual use state of the vehicle based on the displacement information; and
    calculate a road surface state of a road during the use of the vehicle in the second period as the second information regarding the second actual use state of the vehicle based on the first information calculated for the plurality of first periods.

5. The apparatus according to claim 4, wherein the circuitry is configured to calculate the road surface state of the road based on a gain frequency in a frequency response of the displacement information.

6. The apparatus according to claim 1, wherein the circuitry is configured to:
    calculate the first information for each of the plurality of first periods from a starting of a traveling of the vehicle to a stoppage after the traveling of the vehicle of the respective first period; and
    calculate the second information based on the first information of each of the plurality of first periods and a traveling distance in each of the plurality of first periods.

7. A system comprising:
    the apparatus according to claim 1, and
    information providing circuitry configured to provide at least one of information regarding fuel efficiency improvement of the vehicle and information regarding maintenance of the vehicle to a user of the vehicle based on the second information.

8. A method comprising:
    calculating first information regarding a first actual use state of a vehicle in a first period based on displacement information of a sprung part of the vehicle in a height direction acquired by the vehicle; and
    calculate second information regarding a second actual use state of the vehicle in a second period that includes a plurality of the first periods,
    wherein the second information is calculated using the first information of the plurality of first periods.

9. A non-transitory computer readable medium storing a program causing an apparatus to execute:
    calculating first information regarding a first actual use state of a vehicle in a first period based on displacement information of a sprung part of the vehicle in a height direction acquired by the vehicle; and
    calculate second information regarding a second actual use state of the vehicle in a second period that includes a plurality of the first periods,
    wherein the second information is calculated using the first information of the plurality of first periods.

10. The apparatus according to claim 1, wherein
    the first period is a period corresponding to one trip from starting a traveling of the vehicle to stopping the traveling of the vehicle or a period in which the vehicle travels over a predetermined distance, and
    the second period is a period including several weeks, a period including several months, a period from delivery of the vehicle to a user, or a period from a maintenance of the vehicle.

11. The method according to claim 8, further comprising:
    calculating mass of the sprung part during use of the vehicle in the first period as the first information regarding the first actual use state of the vehicle based on the displacement information; and
    calculating a loading state of a loaded object on the vehicle in the second period as the second information regarding the second actual use state of the vehicle based on the mass of the sprung part calculated for the plurality of first periods.

12. The method according to claim 11, further comprising calculating the mass of the sprung part based on a peak frequency in a frequency response of the displacement information.

13. The method according to claim 8, further comprising:
calculating a road surface state of a road during the use of the vehicle in the first period as the first information regarding the first actual use state of the vehicle based on the displacement information; and
calculating a road surface state of a road during the use of the vehicle in the second period as the second information regarding the second actual use state of the vehicle based on the first information calculated for the plurality of first periods.

14. The method according to claim 13, further comprising calculating the road surface state of the road based on a gain frequency in a frequency response of the displacement information.

15. The method according to claim 8, further comprising:
calculating the first information for each of the plurality of the first periods from a starting of a traveling of the vehicle to a stoppage after the traveling of the vehicle of the respective first period; and
calculating the second information based on the first information of each of the plurality of first periods and a traveling distance in each of the plurality of first periods.

16. The method according to claim 8, further comprising providing at least one of information regarding fuel efficiency improvement of the vehicle and information regarding maintenance of the vehicle to a user of the vehicle based on the second information.

17. The method according to claim 8, wherein
the first period is a period corresponding to one trip from starting a traveling of the vehicle to stopping the traveling of the vehicle or a period in which the vehicle travels over a predetermined distance, and
the second period is a period including several weeks, a period including several months, a period from delivery of the vehicle to a user, or a period from a maintenance of the vehicle.

18. The apparatus according to claim 1, wherein
the first period is a period corresponding to one trip from starting a traveling of the vehicle to stopping the traveling of the vehicle, and
the second period is a period including a plurality of the one trips.

19. The method according to claim 8, wherein
first period is a period corresponding to one trip from starting a traveling of the vehicle to stopping the traveling of the vehicle, and
the second period is a period including a plurality of the one trips.

* * * * *